United States Patent [19]

Ishida

[11] Patent Number: 5,669,781
[45] Date of Patent: Sep. 23, 1997

[54] CARTRIDGE CONNECTION MECHANISM

[76] Inventor: Nobuaki Ishida, 2-12, Haneda 1-chome, Ohta-ku, Tokyo, Japan

[21] Appl. No.: 392,726

[22] PCT Filed: Jun. 23, 1994

[86] PCT No.: PCT/JP94/01008

§ 371 Date: Feb. 24, 1995

§ 102(e) Date: Feb. 24, 1995

[87] PCT Pub. No.: WO95/00924

PCT Pub. Date: Jan. 5, 1995

[30] Foreign Application Priority Data

Jun. 24, 1993 [JP] Japan ................... 5-153941

[51] Int. Cl.$^6$ ............................................. H01R 13/62
[52] U.S. Cl. ............................................. 439/326; 439/136
[58] Field of Search ............................. 439/326–329, 439/136–139

[56] References Cited

U.S. PATENT DOCUMENTS

| | | | |
|---|---|---|---|
| 4,200,349 | 4/1980 | Holland | 439/326 X |
| 4,426,122 | 1/1984 | Lainez et al. | 439/326 X |
| 4,468,075 | 8/1984 | Tamura et al. | 439/326 X |
| 4,773,032 | 9/1988 | Uehara et al. | 439/138 X |
| 5,026,297 | 6/1991 | Krehbiel | 439/326 |

FOREIGN PATENT DOCUMENTS

| | | |
|---|---|---|
| 57-30280 | 2/1982 | Japan. |
| 60-167067 | 8/1985 | Japan. |
| 1219974 | 9/1989 | Japan. |
| 453032 | 8/1992 | Japan. |
| 488993 | 8/1992 | Japan. |

Primary Examiner—Khiem Nguyen
Attorney, Agent, or Firm—Price, Gess & Ubell

[57] ABSTRACT

A cartridge connection mechanism for a domestic video game machine. In order to connect a cartridge 2 having a substrate 4 with a body 1 allowing external equipment to reproduce information of the substrate 4 by way of a connector 13, the body is provided with a support frame 7 to be abutted against the back surface of the cartridge 2. The support frame 7 comprises a cartridge connecting section 9 provided on the lower portion of the support frame, and a retainer section provided on the upper portion thereof. The connecting section includes a cartridge insertion hole 11 whose inlet opening 12 has a front-to-back width sufficiently larger than that of the cartridge and whose rear end coincides with an edge of the support frame. The connecting section includes therewithin a gate for guiding the direction of insertion/extraction of the cartridge. The gate has a torsion coil spring 23 serving as a forwardly biasing resilient member. This ensures an easy insertion/extraction of the cartridge by use of a slight force.

22 Claims, 7 Drawing Sheets

CARTRIDGE CONNECTION MECHANISM

TECHNICAL FIELD

The present invention relates to a connection mechanism for a cartridge adapted to be connected to a domestic video game machine.

BACKGROUND ART

In typical domestic video game machines, a cartridge is removably connected to a body in the form of a small-sized case. The cartridge includes a cartridge case and a substrate having information recorded thereon, the substrate being enclosed in the cartridge case. The case-like body on the other hand includes an insertion hole for receiving the cartridge, and a connector provided therewithin for electrical connection to the substrate of the cartridge so as to read the information recorded on the substrate. In such domestic video game machines, the information recorded on the substrate is transmitted by way of the connector to external equipment such as a television set for reproduction as a video image and/or audio sounds. A control means is also provided for controlling the reproduced information.

Such domestic video game machines will enable any general family to readily play games therewith, since domestic televisions may be used as the external video equipment. In addition, different games can be played with appropriate selection, by merely replacing one cartridge with another, which will allow users in a variety of age groups to utilize such video game machines.

However, the prior art entails the following problems. The cartridge insertion hole provided on the body is formed so as not to cause an accident such as detachment of the inserted cartridge due to a little vibration. In order to firmly retain the cartridge case, the insertion hole is shaped to such a degree that it is slightly larger than the cartridge case. On the inside of the insertion hole, an engagement means is provided for engaging with the cartridge case. The engagement means can be, for instance, a clamping section made of a resilient material or an engagement click. For this configuration, upon the insertion the cartridge must be precisely carried to an inlet of the insertion hole, with the need for the direction of insertion orthogonal to the body. Also, an engagement force of approximately 3 kg or over is needed to achieve an engagement with the engagement means. It is thus necessary for the establishment of a secure connection of the cartridge to the body to define the direction of the insertion or extraction with careful attention as well as to bring the cartridge into engagement with the engagement means using an engagement force of approximately 3 Kg or over. Also, at the time of extracting the cartridge, the same force is naturally required to release the engagement.

If the attention to the inserting direction or the engagement force as described above is poor, the cartridge is not able to be securely engaged with the body, and hence the substrate and the connector are not coupled with each other, making it impossible to execute the video game. Moreover, in the worst case, a breakage of the substrate and/or connector will occur within the interior of the insertion hole, and in turn may possibly destroy the video game machine.

In recent years, particularly, besides the cartridge allowing the domestic video game machine to be used to play a game, another type of cartridge is provided which allows the same to be used as an intellectual toy for infants and children in the second grade or under. It is however hard to ask the infants or children in the second grade or under for sufficient attention to the inserting direction or enough engagement force, thus resulting in a higher incidence of the above problems. It is difficult for the preschool children, in particular, to securely insert the cartridge into the hole due to their level of dexterity and strength. For this reason, help of their seniors such as parents is required and therefore additional labor and time have been hitherto necessitated.

Also, in an upward protruding manner, the cartridge is connected to the body horizontally placed for use, with the result that the user's hand or an object is apt to come into contact with the cartridge. An excessive force applied onto the cartridge by such contact with the object will readily cause a defective contact or a damage to the cartridge.

DISCLOSURE OF THE INVENTION

The present invention was conceived to overcome the above problems involved in the prior art. It is therefore the object of the present invention to provide a cartridge connection mechanism ensuring, with a slight force, easy insertion and extraction of a cartridge adapted to be connected to a domestic video game machine as well as preventing the cartridge from being subjected to an excessive force in use.

In order to accomplish the above object, according to an aspect of the present invention, there is provided a cartridge connection mechanism for connecting a cartridge including a substrate having information recorded thereon with a body allowing external equipment to reproduce the information of the substrate via a connector. The cartridge connection mechanism comprises a plate-like support frame provided on the body for supporting the cartridge while abutting against a part or all of the back surface of the cartridge. A cartridge connecting section is provided on the lower part of the plate-like support frame, the cartridge connecting section having on its top surface an inlet opening for the insertion of the cartridge. A retainer section is provided on the upper part of the plate-like support frame for retaining the upper portion of the cartridge.

When the cartridge is connected to the connecting section, the back surface of the cartridge is supported by the support frame and the upper portion thereof is retained by the retainer section. Due to such a plurality of retaining positions, the cartridge is not subjected to an excessive force, resulting in minimizing any occurrence of inconveniences such as a defective contact between the cartridge and the body.

According to another aspect of the present invention the inlet opening of the cartridge connecting section has a front-to-back opening width sufficiently larger than the front-to-back width of the cartridge, and preferably the rear end of the inlet opening coincides with an edge of the plate-like support frame. Owing to this configuration, the cartridge is allowed to be inserted at a forward tilt. Then, when the upper portion of the cartridge is pressed until the back surface of the cartridge is abutted against the support frame, the cartridge can be easily connected to the body with a slight force by the principle of a lever action.

According to a further aspect of the present invention the connecting section may include therewithin a gate for guiding the direction of insertion/extraction of the cartridge, the gate being mounted rotatably in a front-to-back direction. Because of this configuration, the user is capable of inserting the cartridge at a forward tile easy to insert. Then, the gate is backwardly rotated to assure a secure positive connection of the cartridge.

According to still another aspect of the present invention the gate preferably includes a forwardly biasing resilient member. Due to this configuration, upon extraction, the cartridge is forwardly guided at a forward tilt, thus facilitating the extracting operation.

According to a still further aspect of the present invention the connector may include a connection groove for the connection with the substrate, the connection groove having a front wall, and the front wall defining the connection groove may be configured in such a manner that the back surface of the cartridge is abutted against the plate-like support frame while simultaneously the substrate is connected with the connection groove, irrespective of an insertion angle of the cartridge through the inlet opening. By virtue of this configuration, the front wall of the connection groove is formed in such a manner that in spite of a forwardly tilted insertion of the cartridge, the substrate within the cartridge can be connected to the connection groove of the connector, thereby ensuring a smooth connection.

According to yet another aspect of the present invention the retainer section preferably includes an engagement click for engaging with the cartridge, and a resilient member for downward biasing the engagement click. For this reason, the cartridge upper portion is securely retained by the engagement click member. Then, upon the extraction of the cartridge, the engagement click member is raised to thereby easily release the engagement.

BEST MODE FOR CARRYING OUT THE INVENTION (1) Principal Embodiment

A preferred embodiment of the present invention will now be described with reference to the accompanying drawings. This embodiment is intended to encompass the invention defined in the appended claims.

Figure 1:
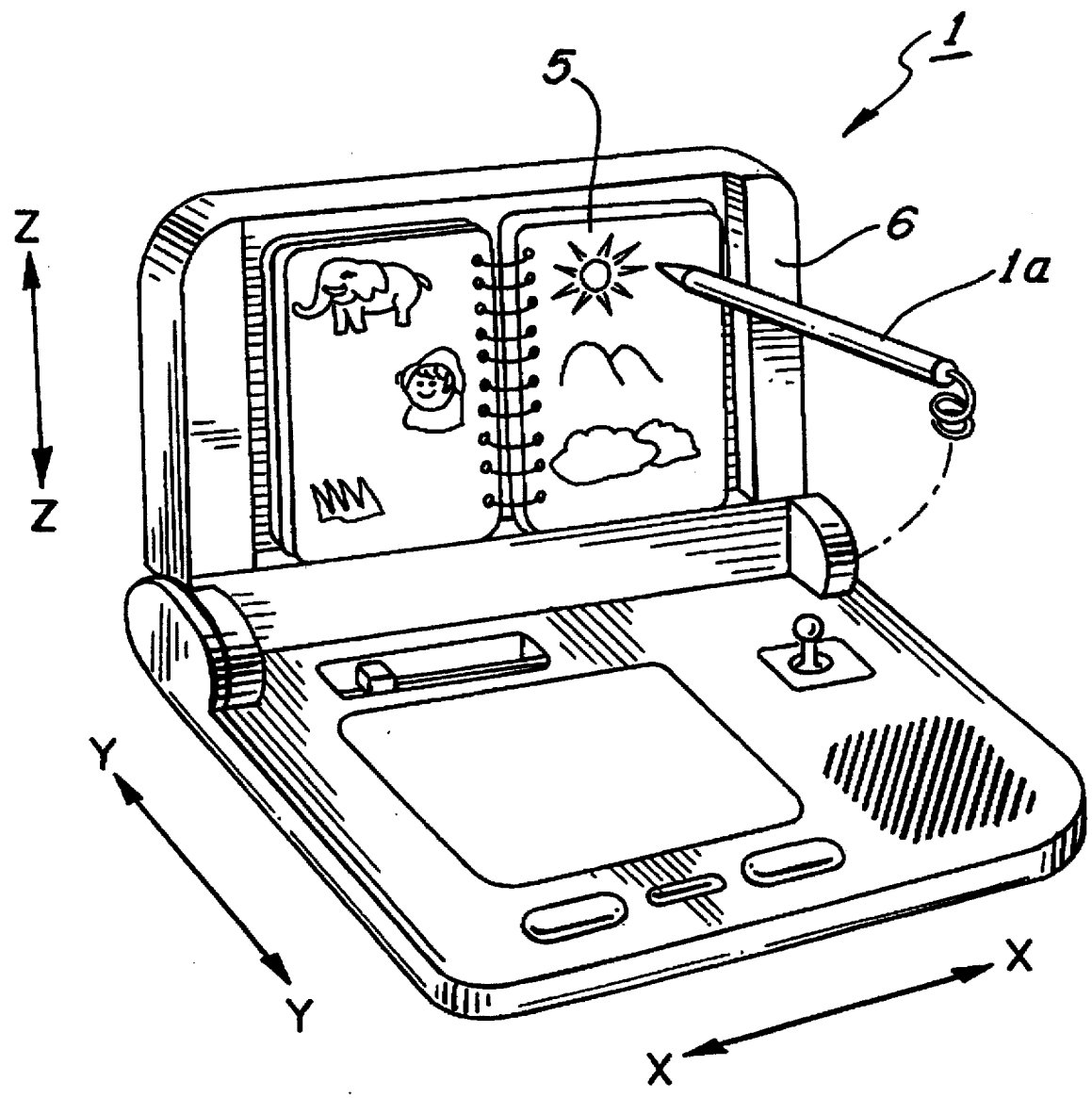
FIG. 1 is a conceptual diagram of a domestic video game machine.
Figure 2:
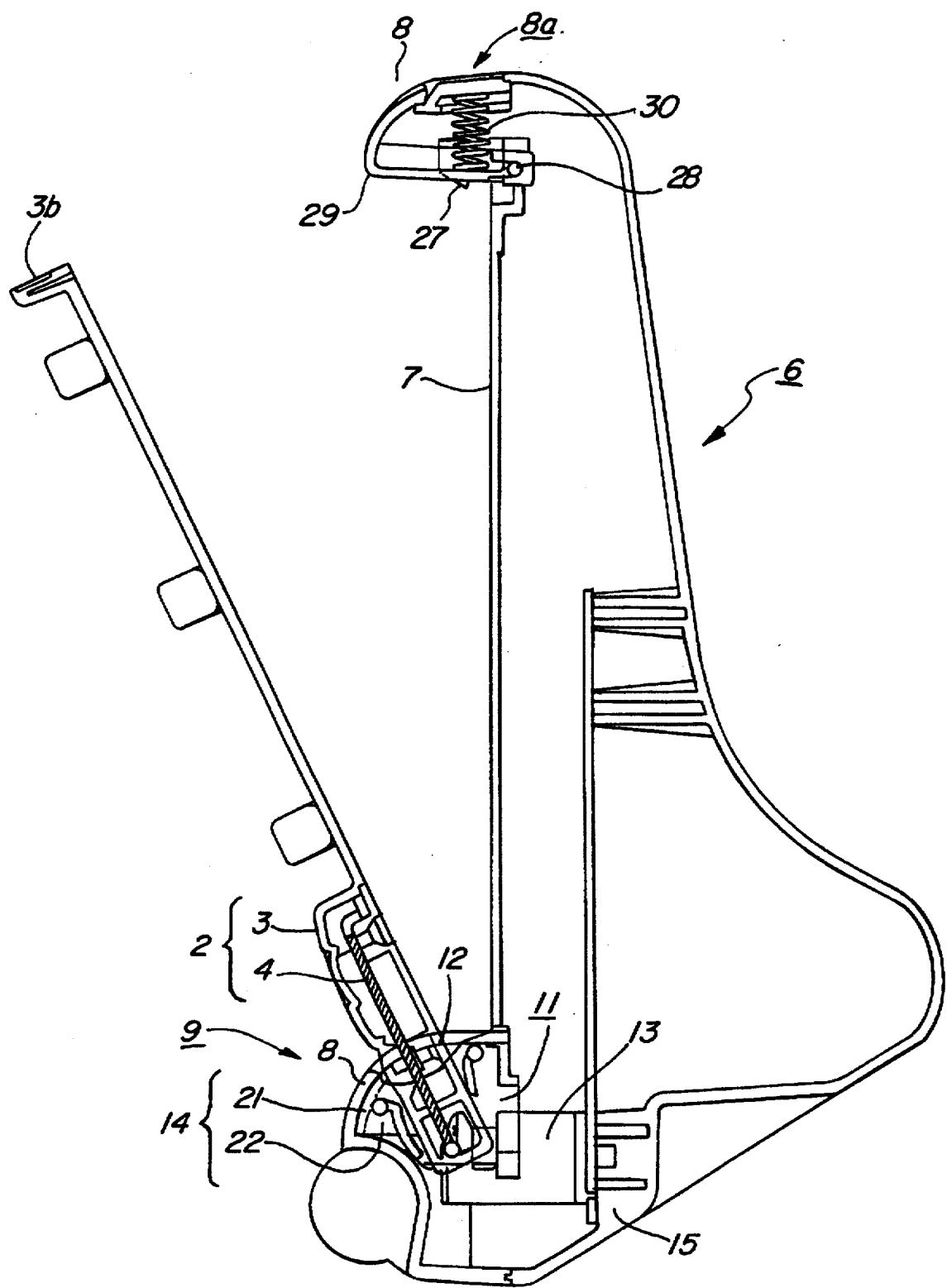
FIG. 2 is a sectional side elevation of a cartridge connection mechanism configured in accordance with an embodiment of the present invention, showing the state at the time of the insertion/extraction of a cartridge.
Figure 3:
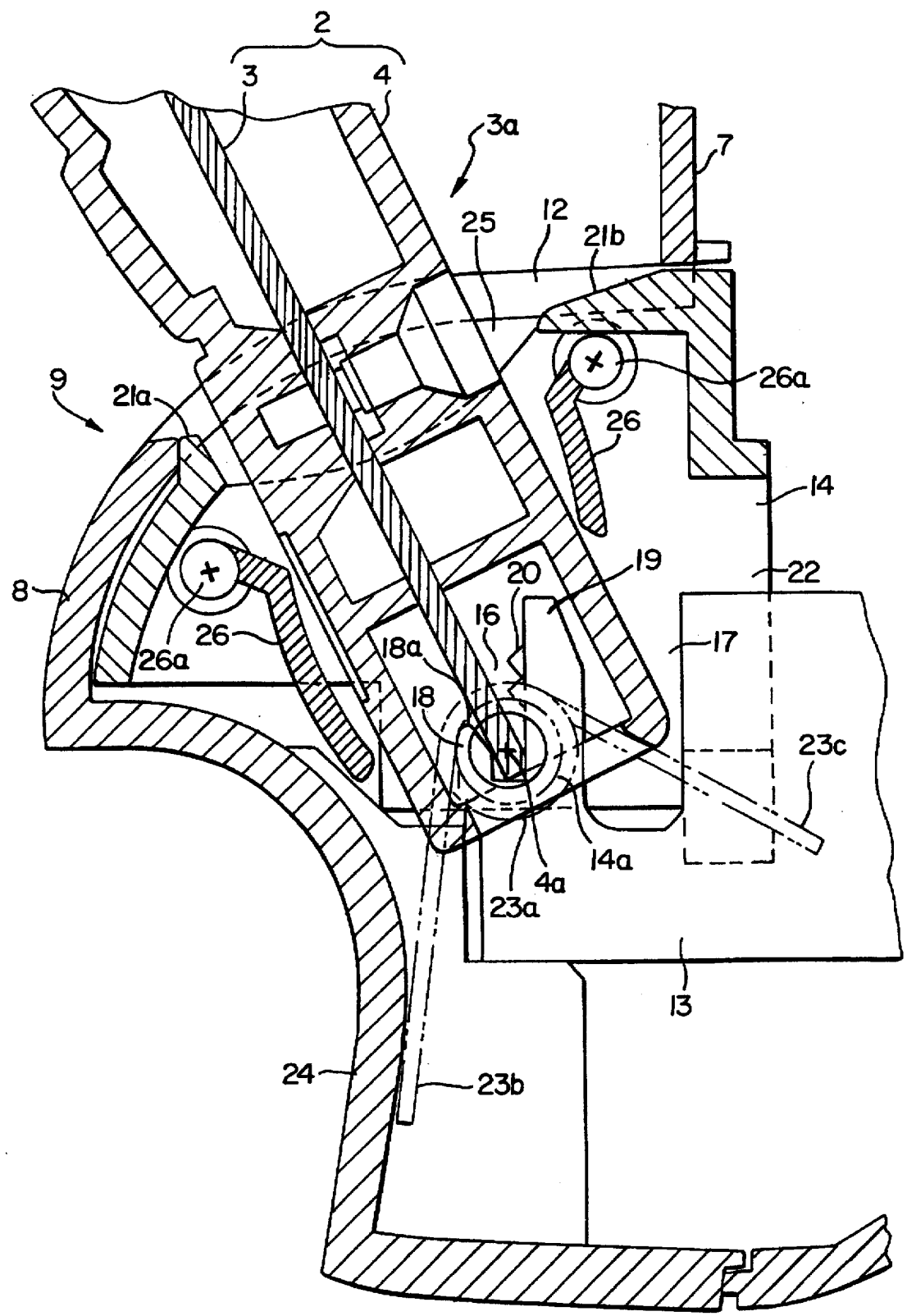
FIG. 3 is an enlarged view of the principal part of FIG. 2.
Figure 4:
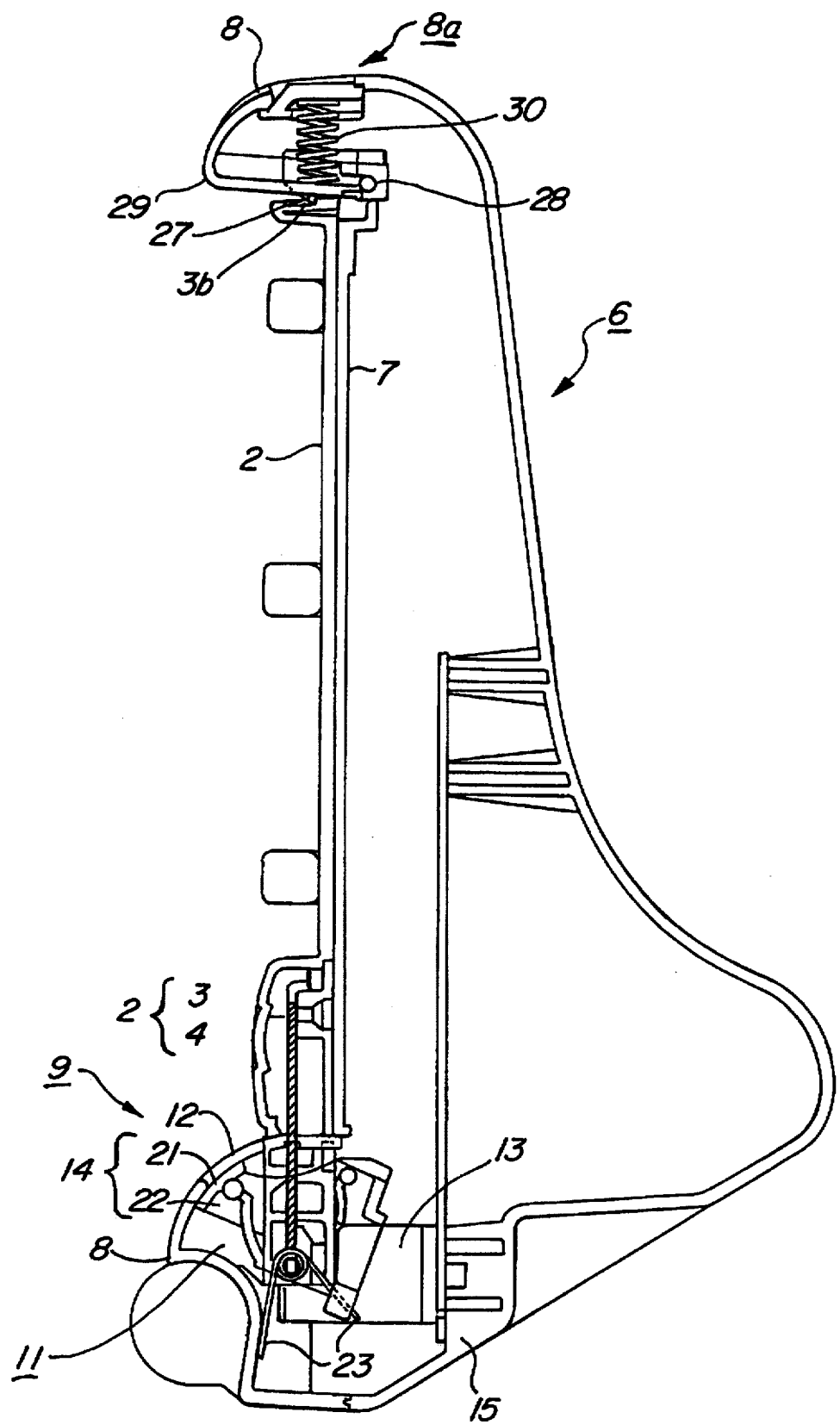
FIG. 4 is a sectional side elevation showing the state upon the connection of the cartridge of FIG. 2.
Figure 5:
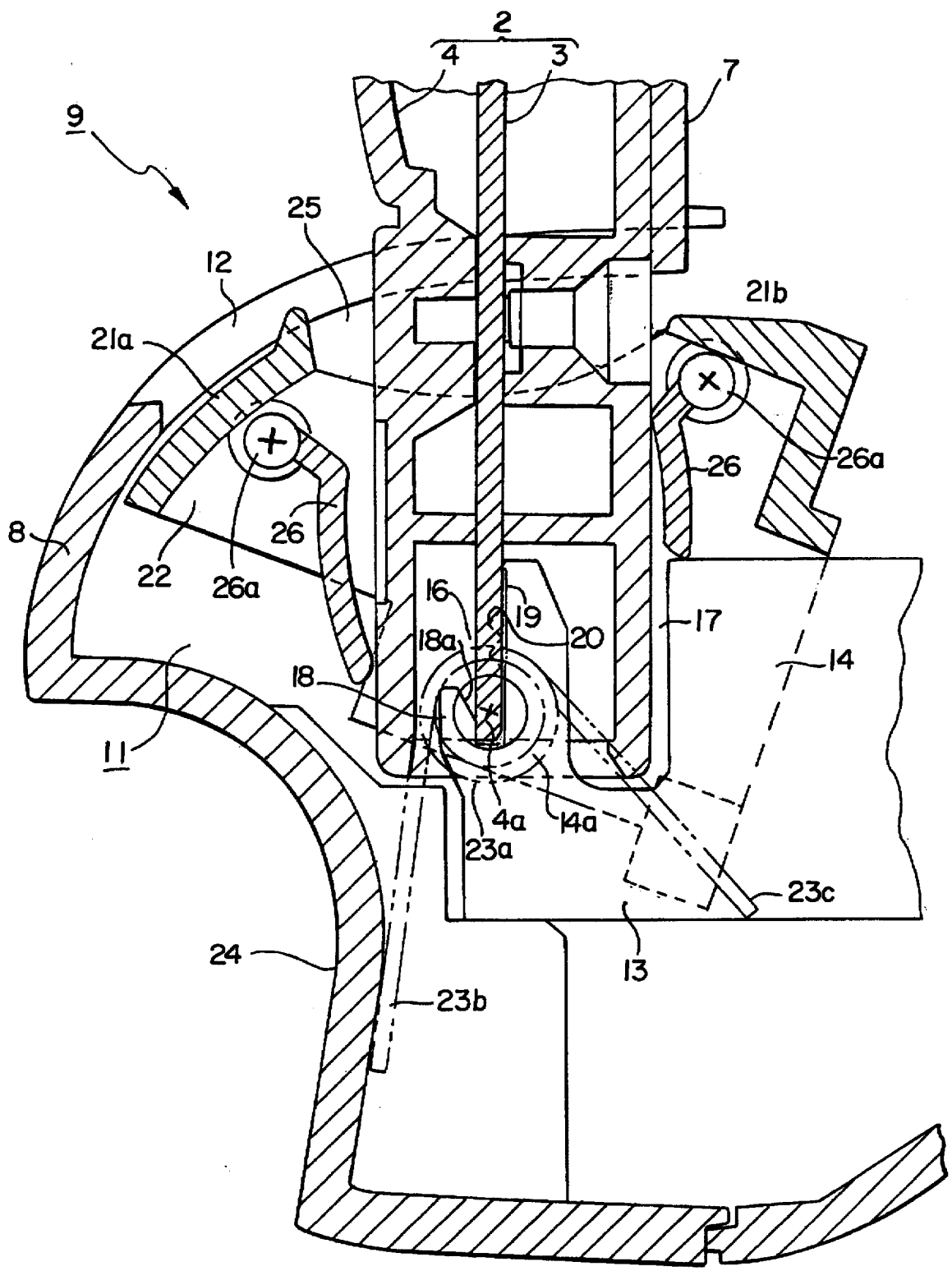
FIG. 5 is an enlarged view of the principal part of FIG. 4.

In this embodiment shown in FIGS. 2 and 3, a cartridge 2 is removably connected to a body 1 of a video game machine for domestic use. The cartridge 2 comprises a cartridge case 3 and a substrate 4 having information recorded thereon, the substrate 4 being enclosed within the cartridge case 3. The cartridge case 3 includes at its lower portion a load/unload section 3a for the connection to the body 1. The load/unload section 3a has at its bottom end an opening, with the substrate 4 being exposed into the interior of the load/unload section 3a. On the surface of such a cartridge case 3 is mounted a printed matter 5 such as a book whose pages can be freely turned over. The printed matter 5 contains information which is common to that of the substrate 4 and printed or described as images. The cartridge case 3 has on the surface at its top end an engagement groove 3b formed to be engaged with an engagement click member provided as a retainer section which will be described later. An operation means 1a such as a touch pen shown in FIG. 1 is provided in order to allow the external equipment such as a television set to reproduce as a video or a voice the information contained in the substrate and the printed matter.

To connect such a cartridge 2 to the body 1 of the domestic video game machine, the body 1 is configured as shown in FIG. 1. The video game machine body 1 is provided with a cover section 6 free to retain, open or close to serve as a connection/retainer section for removably connecting and retaining the cartridge 2. The cover section 6 is configured so as to be vertical when opened. In this embodiment, let X—X direction, Y—Y direction, and Z—Z direction in FIG. 1 be transverse direction, front-to-back direction and vertical direction, respectively.

Such a body cover section 6 comprises an upright plate-like support frame 7 for supporting the cartridge while being in abutment against the rear side of the cartridge upon connecting the cartridge, and a protection frame 8 having a curved surface forwardly protruding from the periphery of the support frame 7 for protecting the periphery of the cartridge. The interior of the protection frame 8 on the lower side is configured as a connecting section 9 for the connection with the cartridge 2. On the contrary, the protection frame 8 on the upper side is configured as a retainer section for the cartridge 2.

The connecting section 9 is provided with an insertion hole 11 for allowing the insertion of the load/unload section 3a of the cartridge. An inlet opening 12 of the insertion hole 11 is formed so as to have in the transverse direction substantially the same width as that of the load/unload section 3a of the cartridge and to have in the forward and backward direction an enough larger width than that of the load/unload section 3a. It is to be appreciated that the rear end of the insertion hole 11 coincides with a joint between the support frame 7 and the protection frame 8 on the lower side. Provided within the interior of the thus opened insertion hole 11 are a connector 13 adapted to be connected to the substrate 4, and a gate 14 serving as an insertion guide for the cartridge case 3. It will be noted that the inlet opening of the insertion hole is formed on the right of the body cover section 6 since the pages of the printed matter 5 mounted on the cartridge 2 are intended to be turned to the left.

The connector 13 is fixedly secured to a fixed member 15 disposed within the body cover 6. In the front portion of the connector 13 are formed a connection groove 16 for receiving the substrate 4 and a case groove 17 for receiving the rear side of the cartridge case 3, both grooves opening upward. A front wall 18 defining the connection groove 16 has a height sufficiently less than that of a rear wall 19, thereby ensuring that when inserting the cartridge 2 at a forward tilt, the substrate 4 is smoothly fitted into the connection groove 16. The front wall 18 further has a taper 18a so as to be downward inclined toward the wall surface confronting the connection groove 16. The surface of the rear wall 19 confronting the groove 16 is formed upright and is provided with a contact pin 20 arranged on the upper portion of the surface, the contact pin 20 having a forward biasing resilience. Within the connection groove 16 thus configured, the inserted substrate 4 is rotated on a fulcrum 4a, in the vicinity of the bottom surface of the connection groove 16, from the state where the substrate is forwardly tilted along the taper 18a to the upright state.

The gate 14 comprises a gate upper portion 21 provided along the inner surface of the lower side protection frame constituting the connecting section 9, and right and left sidewalls 22 positioned so as not to come into contact with the inserted cartridge 3, the gate upper portion 21 being carried on the right and left sidewalls 22. Between the right and left sidewalls 22 of the gate 14 extends a gate pivotal shaft 14a positioned at the rotational fulcrum 4a of the substrate 4, the gate 14 being mounted rotatably around the gate pivotal shaft in the forward and backward direction. A torsion coil spring 23 is arranged on the gate pivotal shaft 14a in such a manner that the coil 23a is wound on the outer periphery of the shaft 14a. On its rewinding direction side, a forward arm 23b of the torsion coil spring 23 is engaged with a fixed member 24 of the connecting section 9, while the rearward arm 23c thereof is fixed to the ends of the gate sidewalls 22.

The gate upper portion 21 is provided with a gate opening section 25 corresponding to the inlet opening 12 of the insertion hole 11. The gate opening section 25 is defined by a front gate 21a and a rear gate 21b in such a manner that the front-to-back opening width of the gate opening section 25 is larger than the front-to-back width of the load/unload section 3a of the cartridge case 3 and smaller than that of the inlet opening 12 of the insertion hole 11. The end of the front gate 21a is brought into engagement with the forward end of the inlet opening 12 of the insertion hole 11, thereby limiting the forward rotation of the gate 14. At their respective gate opening section side ends, the above front gate 21a and rear gate 21b are fitted with a downward rotatable gate door 26. The couple of doors 26 are adapted to close the gate opening section 25 unless the cartridge 2 is inserted.

As a retainer section for the cartridge 2, on the other hand, the upper side protection frame 8 of the body cover section 6 is fitted with an engagement click member 27 to be engaged with the engagement groove 3b located at the top end of the cartridge case 3. The engagement click member 27 is provided in such a manner that it is vertically rotatable on a pivotal shaft 28 extending from the support frame 7 of the body cover section 6. The upper side protection frame 8 of the body cover section 6 is further fitted with an ejection button 29 for throwing out the cartridge being under connection. The ejection button 29 is provided in such a manner that it is vertically rotatable on the same pivotal shaft 28 as used for the engagement click 27. The ejection button 29 is further fitted with a resilient member 30 for downward biasing the ejection button, thereby urging downward the engagement click 27 having the same pivotal shaft 28 as the ejection button 29.

(Function of Embodiment)

The function of this embodiment thus configured is as follows. In the domestic video game machine 1 incorporating a cartridge connection mechanism of this embodiment, unless a cartridge is under connection, the gate 14 is urged so as to forward rotate around the gate pivotal shaft 14a by means of the torsion coil spring 23. This will allow the gate 14 to be rotated to a position where the end of the front gate 21a abuts against the fore end of the inlet opening 12 of the insertion hole. Under this condition, the inlet opening 12 of the insertion hole is closed by the rear gate 21b located at the gate upper potion and by the front and rear gate doors 26 of the gate opening section.

Figure 6:
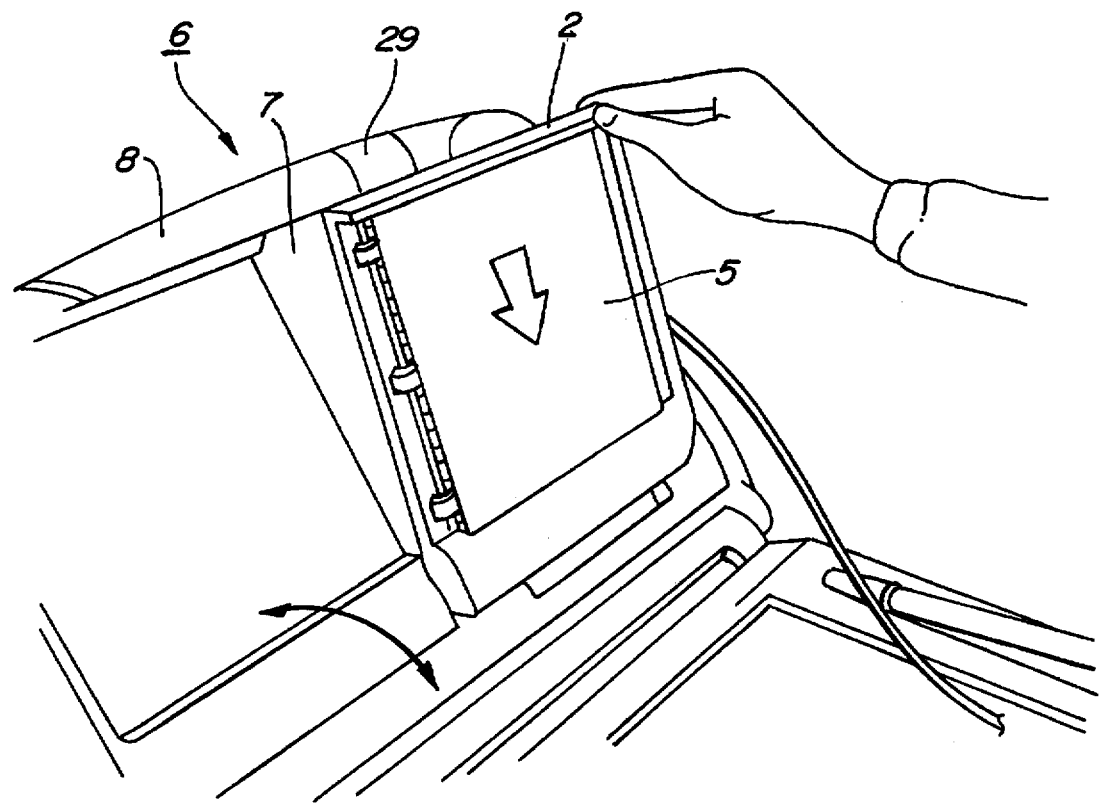
FIG. 6 is a conceptual diagram showing the direction of insertion during the cartridge inserting operation.

When the cartridge 2 is required to be connected to the body cover section 6, the load/unload section 3a of the cartridge is inserted into the insertion hole 11 as shown in FIG. 6. At that time, the rear part of the inlet opening 12 of the insertion hole is blocked by the rear gate 21b, and hence the cartridge is to be inserted into the gate opening section 25. This is achieved by inserting the cartridge 2 in such a manner as to downward press the gate doors 26, and by fitting the substrate 4 within the cartridge into the connection groove 16 along the taper 18a of the connector 13. The front and rear sides of the cartridge clamping the substrate 4 are inserted, respectively, along the fore end of the connector 13 and along the interior of the case groove 17 of the connector. In this manner, the cartridge 2 is inserted until the lower end of the substrate 4 abuts against the bottom of the connection groove 16.

Figure 7:
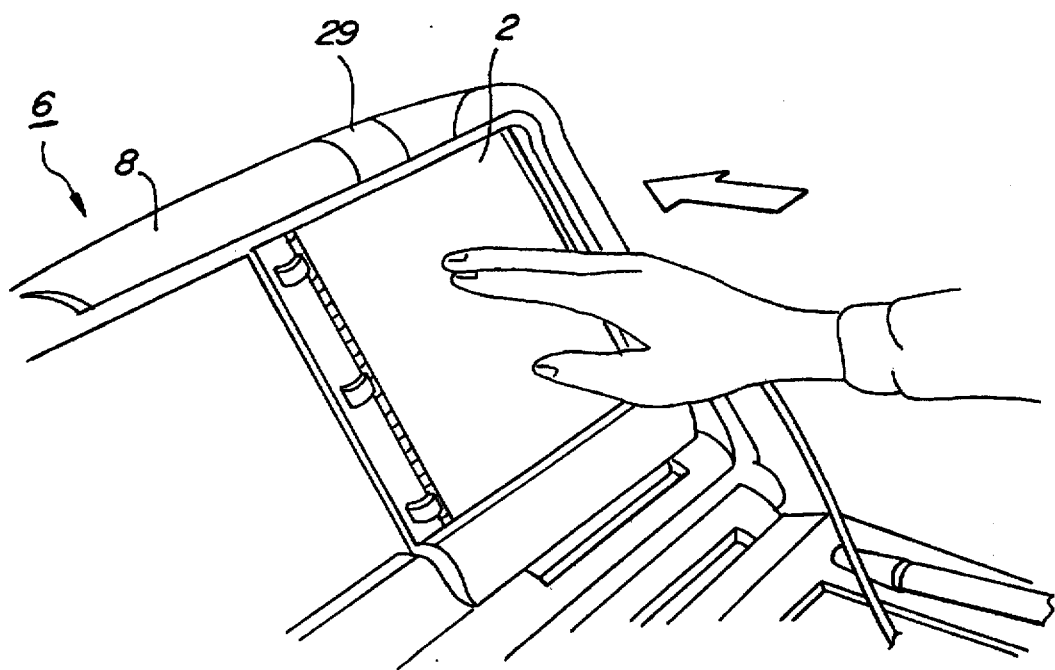
FIG. 7 is a conceptual diagram showing the direction of press during the cartridge inserting operation.

After the complete insertion of the cartridge, the upper part of the cartridge 2 is pressed backward as shown in FIG. 7. This allows the cartridge 2 to rotate backward until the back surface of the cartridge case 3 is brought into abutment against the upright support frame 7. At that time, the back surface of the cartridge is first abutted against the rear gate 21b to press the rear gate 21b. This will cause the gate 14 to be backward rotated on the pivotal shaft 14a constituting the fulcrum 4a for the substrate. It is to be appreciated that when the back surface of the cartridge case 3 comes into abutment against the support frame 7, the substrate 4 within the cartridge 2 presses the contact pin 20 and abuts against the upright front surface of the rear wall 19 defining the connection groove 16.

A backward rotation of the cartridge 2 allows the engagement click member 27 of the upper side protection frame of the body cover section 6 to come into contact with the top of the cartridge case 3, and a further backward rotation of the cartridge 2 causes the engagement click member 27 to upwardly rotate on the pivotal shaft 28. At that time, while being downwardly urged by a biasing force of the resilient member 30 of the ejection button 29 having the same pivotal shaft 28, the engagement click member 27 slides along the top surface of the cartridge case, and once the cartridge becomes vertical, is snugly engaged with the engagement groove 3b. In this manner, the cartridge 2 is connected to the body 1 of the video game machine. Afterwards, to play a game, for example, the operation means not shown of the video game machine 1 is operated so as to allow the information of the substrate 4 or the information of the printed matter 5 placed on the cartridge surface to be reproduced on the external equipment such as a television set not shown.

Figure 8:
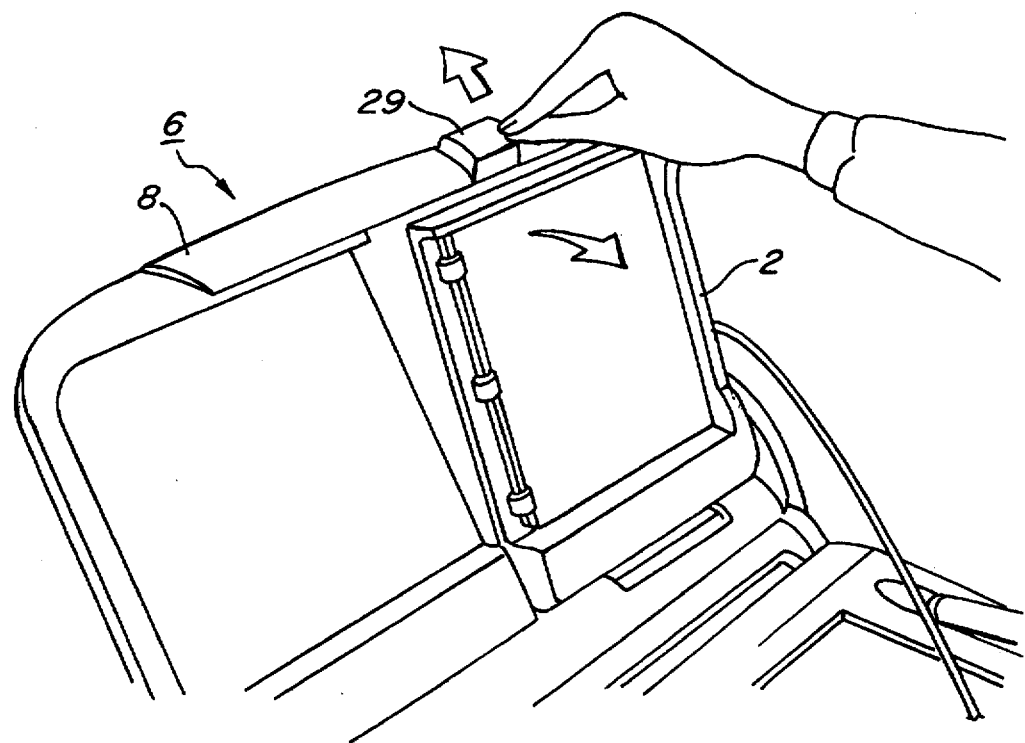
FIG. 8 is a conceptual diagram showing the operation of an ejection button during the cartridge extracting operation.

Then, upon the extraction of the cartridge 2, as shown in FIG. 8, the ejection button 29 disposed on the upper side protection frame of the body cover section 6 is upwardly rotated. This will result in an upward rotation of the engagement click member 27 fitted to the same pivotal shaft 28 as the ejection button 29, causing a disengagement of the cartridge case from the engagement groove 3b. On the contrary, the gate 14 is at all times subjected to a forward biasing force by the torsion coil spring 23. Therefore, once the engagement click member 27 is disengaged from the engagement groove 3b, the gate will forwardly rotate. As a result of this, the case 3 of the cartridge 2 is forwardly pressed by the rear gate 21b. In addition, the substrate of the cartridge is at all times forward urged by the contact pin having a resilience provided on the connection groove 16 of the connector 13. Thus, the cartridge 2 is forward tilted.

Figure 9:
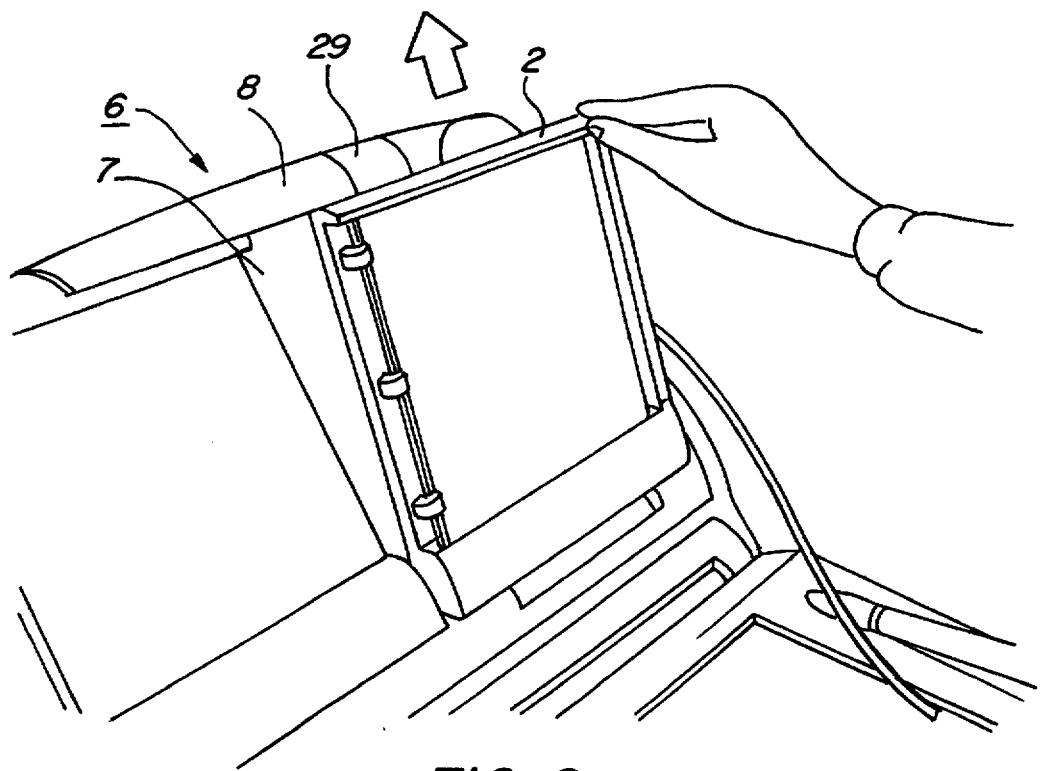
FIG. 9 is a conceptual diagram showing the direction of extraction during the cartridge extracting operation.

When raising the cartridge 2 under this condition, as shown in FIG. 9, it can be easily pulled out from the insertion hole 11.

(3) Effect of Embodiment

The effect of the cartridge connection mechanism of this embodiment described above is as follows. In this embodiment, the protection frame 8 is provided with the cartridge insertion hole 11 whose opening has a larger front-to-back width and whose insertion part is guided by the gate 14, with the result that the insertion hole is forward tilted approximately 30 degrees, facilitating the cartridge inserting operation. By virtue of this configuration, the cartridge 2 can be easily loaded at a tilt into the insertion hole. In particular, this angle will contribute to an easy insertion by infants.

Furthermore, after the insertion, the upper portion of the cartridge is backwardly pressed to bring the back surface of the cartridge case 3 into abutment against the support frame 7, thereby ensuring a secure connection of the cartridge substrate 4 with the connector 13. Although the backward pressing force at that time works in the opposite direction to the biasing force of the torsion coil spring 23, the connection between the substrate 4 and the connector 13 can be accomplished by a slight force with the aid of the principle of the lever using the fulcrum 4a at the lower end of the substrate 4. A force necessary for the secure connection is of the order of 500 g which is considerably smaller than 3 kg required in the prior art. This will enable an infant to achieve the connection of the cartridge by himself.

In addition, simultaneously with the abutment of the cartridge against the support frame, the engagement click member 27 is engaged with the engagement groove 3b located at the top of the cartridge, whereupon based on resultant sound or feeling, the user is capable of judging that the substrate 4 and the connector 13 are under secure connection. Then, irrespective of a release of his hand from the cartridge, the connection between the substrate and the connector can be securely maintained.

Also, in the case of extraction of the cartridge, by use of the ejection button 29, only a slight force is required to readily disengage the engagement click member 27 from the engagement groove 3b of the cartridge. Since the cartridge 3 is forwardly tilted by the biasing force of the torsion coil spring 23 and the contact pin 20 of the connector 13, the cartridge is easy to pull out. It is to be noted that the contact pin will ensure an improved contact since it rubs the substrate pattern upon inserting the cartridge.

In this manner, the cartridge is retained by two vertically separated points for the engagement with the body, so that the cartridge insertion/extraction can be accomplished using a slight force.

Further, in order to securely retain the cartridge within the body, the back surface of the cartridge abuts against the body cover section, and the upper and lower edges of the cartridge are engaged with the body cover section. This will prevent the occurrence of an accident that the cartridge comes off when the body undergoes a vibration. Although when particularly using a touch pen as the operation means, the cartridge case may be subjected to a contact force, this force and the resultant vibration can be absorbed. Moreover, except the front, the cartridge is not to be accessed by the hands or objects since the periphery of the cartridge is enclosed by the protection frame, whereby the cartridge will not be subjected to any excessive force. Accordingly, the secure connection of the substrate with the body is accomplished, and hence the problems such as defective contact will not take place unless the body itself undergoes a greater vibration, for example, due to a fall onto the floor, resulting in a high reliability.

Also, in this embodiment, the cartridge is loaded within the body cover section capable of opening and closing, and hence after the completion of the game, the cover section may be closed with the cartridge being loaded. Under this condition, the cartridge is protected by the body. For this reason, even though the body is carried by the user, the cartridge will not be subjected to any excessive force and damage.

(4) Other Embodiments

The present invention is not intended to be limited to the above-described embodiment, and its specific shapes or attachment positions or manners are appropriately modifiable.

By way of example, a means for forwardly biasing the gate 14 is not limited to the torsion coil spring 23, but instead the other resilient member may be employed to forward press the upper portion of the back surface of the gate for biasing. Also, the body cover section 6 is not limited to the configuration in which its support frame 7 becomes vertical when opened, but instead may be tilted at an angle desired by the game machine user. In such a case, since the connecting section and the interior connector also similarly rotate, the cartridge may be tilted at the same angle as the support frame of the cover section. Further, the cartridge surface need not necessarily be mounted with a book, but instead a card bearing information printed and described thereon and common to the substrate may be mounted. No mounting is also possible. Alternatively, an instruction book may be mounted thereon for use if needed by the user.

Furthermore, the cartridge connection mechanism of the present invention is not limited to the provision into the domestic video game machine, but instead may be incorporated into electronic equipment of a type deriving information from the other cassette, whereby the same effect as the above-described embodiment can be obtained.

[Industrial Applicability]

According to the present invention, as described above, there can be provided a high-reliable cartridge connection mechanism capable of easily executing the insertion/extraction of the cartridge to be connected to the domestic video game machine using a slight force, and not subjected to any excessive force in the process of use.

What is claimed is:

1. A cartridge connection mechanism for connecting a cartridge including a substrate having information recorded thereon with a body allowing external equipment to output the information of said substrate via a connector, said cartridge connection mechanism comprising:

a body member having a lower support surface and an openable cover section;

a plate-like support frame provided on said cover section for supporting said cartridge while abutting against a part or all of the back surface of said cartridge, said plate-like support frame extending approximately vertically upward from said lower support surface when the cover section is opened;

a cartridge connecting section provided on the lower part of said plate-like support frame, said cartridge connecting section having on its top surface an inlet opening for the insertion of said cartridge; and a retainer section provided on the upper part of said plate-like support frame for retaining the upper portion of said cartridge.

2. A cartridge connection mechanism according to claim 1, wherein said inlet opening of said cartridge connecting section has a width sufficiently larger than a width of said cartridge, and a rear end of said inlet opening coincides with an edge of said plate-like support frame.

3. A cartridge mechanism according to claim 1, wherein
said connecting section includes therewithin a gate for guiding the direction of insertion/extraction of said cartridge, said gate being rotatably mounted.

4. A cartridge connection mechanism according to claim 3, wherein
said gate includes a biasing resilient member.

5. A cartridge connection mechanism according to claim 1, wherein
said connector includes a connection groove for the connection with said substrate, said connection groove having a front wall, and wherein
said front wall defining said connection groove is configured in such a manner that the back surface of said cartridge is abutted against said plate-like support frame while simultaneously said substrate is connected with said connection groove, irrespective of an insertion angle of said cartridge through said inlet opening.

6. A cartridge connection mechanism according to claim 1, wherein
said retainer section includes an engagement click for engaging with said cartridge, and a resilient member for downward biasing said engagement click.

7. An information medium connection mechanism for connecting an information medium having upper and lower portions including a storage medium having information stored therein with an electronic equipment body allowing external equipment to output the information of said storage medium via a connector, said information medium connection mechanism comprising:
a support frame provided on said electronic equipment body for supporting said information medium while abutting against a part or all of a back surface of said information medium;
a connecting section provided on a lower part of said support frame for connecting a lower portion of said information medium;
a retainer section provided on an upper part of said support frame for contacting and releasably retaining an upper portion of said information medium,
said connecting section including:
an inlet opening provided on a top of said connecting section for receiving said lower portion of said information medium;
a support section for rotatably supporting said information medium, said support section contacting said lower end of said information medium received through said inlet opening and enabling a pivoting movement about a contact point; and
an electric contact section for electrically connecting said information medium with said connector by electrically connecting with said information medium when the back surface of said information medium supported by said support section is pivoted to lie in a predetermined angular state in which it comes into abutment against said support frame and is releasably retained by the retainer section;
said retainer section adapted to releasably retain a top of said information medium when said information medium is connected to said connecting section in said predetermined angular state.

8. An information medium connection mechanism according to claim 7, wherein
said inlet opening of said connecting section has an opening width sufficiently larger than a width of said information medium, and wherein a rear end of said inlet opening coincides with an edge of said support frame.

9. An information medium connection mechanism according to claim 7, further comprising:
a gate provided rotatably on a pivotal shaft comprised of a portion coinciding with said contact point of said lower end of said information medium within said connecting section, for guiding the direction of insertion/extraction of said information medium.

10. An information medium connection mechanism according to claim 7, wherein
said support section of said connecting section includes a connection groove provided in said connector for connecting with said storage medium of said information medium, and wherein
said connection groove includes a bottom for supporting the end of said storage medium, a front wall surface forwardly tilted with respect to said support frame, and a rear wall surface substantially parallel to said support frame, and wherein
said rear wall surface of said connecting groove is brought into abutment against said storage medium when said storage medium is inserted into said connecting groove and when the back surface of said information medium lies in a predetermined angular state in which it abuts against said support frame, and wherein
said electrical contact section of said connecting section is provided at a portion coming into abutment against said storage medium on said rear wall surface.

11. An information medium connection mechanism according to claim 9, further comprising:
a resilient member for forward biasing said gate.

12. Electronic equipment intended to be connected to an information medium including a storage medium having information stored therein, said electronic equipment adapted to allow external equipment to output the information of said storage medium by way of a connector, said electronic equipment comprising:
a support frame for supporting said information medium while abutting against a part or all of the back surface of said information medium;
a connecting section provided on the lower part of said support frame for connecting the lower part of said information medium;
a retainer section provided on an upper part of said support frame for contacting and releasably retaining the upper portion of said information medium,
said connecting section including:
an inlet opening provided on the top thereof for receiving said information medium;
a support section for rotatably supporting said information medium on a pivotal shaft, said support section contacting an end of said lower part of said information medium received through said inlet opening to enable a pivoting movement about said end; and
an electric contact section for electrically connecting said information medium with said connector by electrically connecting with said information medium when the back surface of said information medium supported by said support section is pivoted to lie in a predetermined annular state in which it comes into abutment against said support frame and is releasably retained by the retainer section;
said retainer section adapted to releasably retain a top of said information medium when said information medium is connected to said connecting section in the predetermined angular state.

13. Electronic equipment according to claim 12, wherein said inlet opening of said connecting section has an opening width sufficiently larger than a of said information medium, and wherein a rear end of said inlet opening coincides with an edge of said support frame.

14. Electronic equipment according to claim 12, further comprising:

a gate provided rotatably on a second pivotal shaft comprised of a portion coinciding with said pivotal shaft within said connecting section, for guiding the direction of insertion/extraction of said information medium.

15. Electronic equipment according to claim 12, wherein said support section of said connection section includes a connection groove provided in said connector for connecting with said storage medium of said information medium, and wherein said connection groove includes a bottom for supporting the end of said storage medium, a front wall surface forwardly tilted with respect to said support frame, and a rear wall surface substantially parallel to said support frame, and wherein said rear wall surface of said connecting groove is brought into abutment against said storage medium when said storage medium is inserted into said connecting groove and when the back surface of said information medium lies in a predetermined angular state in which it abuts against said support frame, and wherein said electrical contact section of said connecting section is provided at a portion coming into abutment against said storage medium on said rear wall surface.

16. Electronic equipment according to claim 14, further comprising:

a resilient member for forward biasing said gate.

17. An electronic equipment having a cartridge connection mechanism for removably connecting a cartridge, said electronic equipment comprising:

a connector section electrically connected to said cartridge;

a retainer section for releasably retaining said cartridge when connected to the electronic equipment;

said connector section including a contact member having terminals arranged thereon and a guide member provided adjacent to the contact member to leave a space between itself and the contact member;

said cartridge including a substrate having a contact section provided at a portion thereof, corresponding to the terminals;

said electronic equipment being connected to said cartridge by inserting a portion of said cartridge having said contact section on said substrate between said contact member and said guide member so as to initially provide said cartridge with an inclination relative to a predetermined position where said cartridge is to be connected with the electronic equipment, the guide member enabling an operator to push the cartridge to pivot it around the inserted portion of the substrate until the contact section of the substrate contacts with said terminals.

18. An electronic equipment according to claim 17, wherein said contact member is formed from a conductive resilient material and biased in the direction of said contact section of said substrate.

19. An electronic equipment according to claim 17, further comprising:

an opening member having an opening for receiving at least one portion of said cartridge; and a resilient member provided adjacent the opening member, wherein said resilient member is adapted to bias said opening member in a direction to pivot the opening member for enabling said cartridge to be inserted with a tilted inclination relative to said predetermined position and to be removed from the electronic equipment.

20. An electronic equipment according to claim 17, further comprising a cartridge support section for supporting said cartridge while abutting against a back surface of the cartridge.

21. An electronic equipment according to claim 17, wherein said retainer section is a click-like projecting member to be engaged with a cutout section formed in a portion of said cartridge.

22. An electronic equipment according to claim 17, wherein said cartridge includes a cutout section to be engaged with said retainer section and a connecting section to be electrically connected with said connector section.

* * * * *